J. C. VAUGHAN.
WHIFFLETREE HOOK AND CLIP.
APPLICATION FILED DEC. 7, 1912.

1,144,573.

Patented June 29, 1915.

Witnesses
Edwin F. McKee
Mary King

Inventor
James C. Vaughan
By George W. Sues.
Attorney

UNITED STATES PATENT OFFICE.

JAMES C. VAUGHAN, OF NEEDMORE, OKLAHOMA.

WHIFFLETREE HOOK AND CLIP.

1,144,573.  Specification of Letters Patent.  Patented June 29, 1915.

Application filed December 7, 1912. Serial No. 735,455.

*To all whom it may concern:*

Be it known that I, JAMES C. VAUGHAN, a citizen of the United States, and a resident of Needmore, in the county of Delaware and State of Oklahoma, have invented certain new and useful Improvements in Whiffletree Hooks and Clips, of which the following is a specification, reference being had to the accompanying drawings.

This invention relates to certain new and useful improvements in whiffle-trees employed in connection with heavy vehicles and farm machinery and comprises a whiffle-tree hook and clip; and the primary object of my invention is to provide a device of this general character, of a simple and inexpensive nature and of a durable construction, which shall be capable of convenient adjustment upon the end of the whiffle-tree to strengthen the end of the tree and provide a convenient means for positively securing a trace chain or tug to the whiffle-tree.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

Figure 1:
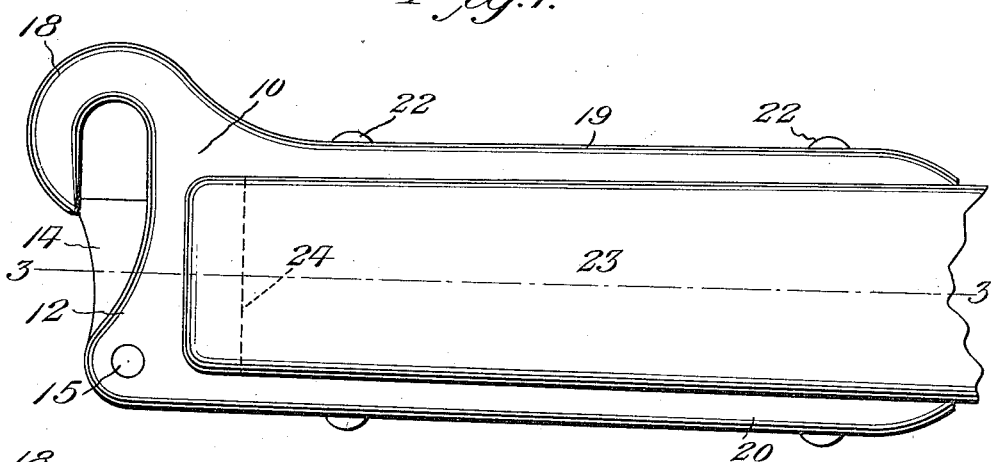
Figure 2:
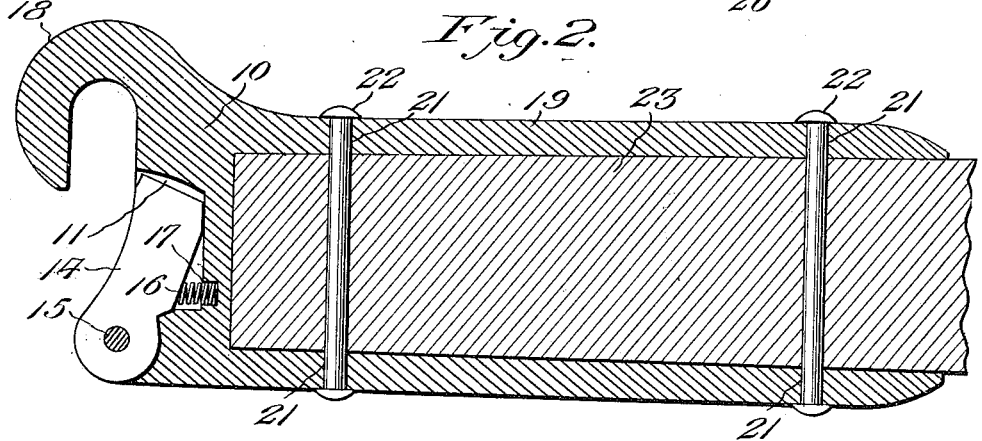
Figure 3:
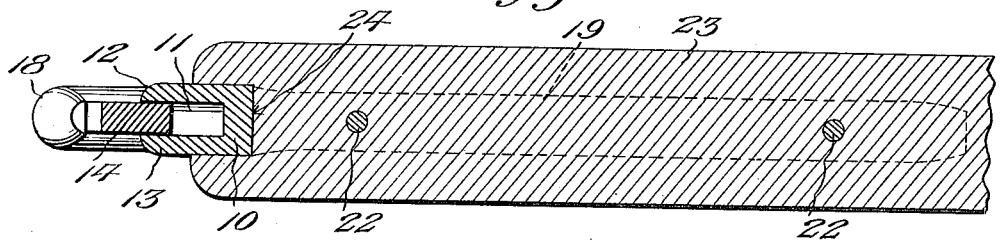

In the accompanying drawings forming a part of this specification, and in which like numerals of reference indicate similar parts in the several views:—Figure 1, shows a plan view of a whiffle-tree hook and clip embodying my invention disclosing the same as secured to the broken end of a whiffle-tree. Fig. 2, is a lengthwise transverse sectional view of Fig. 1. Fig. 3, is a section on line 3, 3 of Fig. 1.

In my present invention I provide a whiffle-tree hook and clip arranged to be secured within a gain 24, formed in the end of the whiffle-tree, as the one shown in the drawings and marked 23. The hook and clip include a head forming section 12, which is partly held within the gain 24. As shown this head has the enlargement 10 from which is continued the hook 18. At the end opposite the hook and entering the main portion of the head, is the lengthwise extending socket 11 and this socket has a communicating seat 17, and is traversed near its end by a pin opening arranged to receive the pin 15. As shown in Fig. 2 the end of the hook 18 projects partly over the socket 11. Extending from and forming an integral part of the head 12 are the two apertured clips 19 and 20 which extend from said head in a direction opposite the hook 18 in parallel spaced relation. These clip arms are arranged to tightly clasp upon the end of the whiffle-tree 23, being secured thereto by means of the rivets 22.

Pivotally held upon the pin 15 is a dog 14, having an upper square end as shown, and this upper end of the dog is arranged to contact with the lower end and inner face of the hook 18, in the manner shown in Fig. 1, to form an opening in conjunction with the hook, within which may be securely held the terminal link of the trace chain, or an eye of a tug strap.

In order to insure the dog being in normal contact with the hook end, I place a coil spring 16 within the seat 17, this spring being arranged to normally force the dog against the hook. The socket 11, is of such a depth so that it will entirely receive the dog when the same is forced backward against the tension of the spring, as shown in Fig. 2, which discloses the dog in position when the last link of a chain or the eye of a tug is being attached or removed from the whiffle-tree.

As shown the socket end of the head extends outward to a point in alinement with the inner face of the hook 18.

It is of course understood that these whiffle-tree hooks and clips are made in various sizes and that they are attached to the whiffle-trees in any suitable workmanlike manner.

The device is simple and inexpensive in construction and both durable and efficient in operation.

Having thus described my said invention what I claim as new and desire to secure by United States Letters Patent is:

The combination with a whiffle-tree having a gain in its end, of a clip including a head-forming section partly held within said gain having an enlargement from which is continued a hook, a lengthwise extending socket entering the main portion of said head having a communicating seat the lower end of said hook extending partly over said socket, two integral apertured clips extending from said head in parallel spaced relation and clasping said whiffletree, bolts passing through the apertures of said clips, a pin held within said head opposite said hook, a dog upon said pin adapted at times to enter said socket and said dog arranged to contact with the lower end and inner face of said hook, and a spring within said seat to normally force said dog into contact with said hook, as and in the manner set forth.

In testimony whereof I affix my signature, in presence of two witnesses.

JAMES C. VAUGHAN.

Witnesses:
J. B. KING,
W. R. STEWART.

Copies of this patent may be obtained for five cents each, by addressing the "Commissioner of Patents, Washington, D. C."